US007164836B2

(12) United States Patent
Wright et al.

(10) Patent No.: US 7,164,836 B2

(45) Date of Patent: Jan. 16, 2007

(54) LIGHT-GUIDE LIGHTS SUITABLE FOR USE IN ILLUMINATED DISPLAYS

(75) Inventors: John C. Wright, Bucks (GB); Michael C. Lea, Bracknell (GB)

(73) Assignee: 3M Innovative Properties Company, St. Paul, MN (US)

( * ) Notice: Subject to any disclaimer, the term of this patent is extended or adjusted under 35 U.S.C. 154(b) by 201 days.

(21) Appl. No.: 10/491,097

(22) PCT Filed: Oct. 3, 2002

(86) PCT No.: PCT/US02/31419

§ 371 (c)(1),
(2), (4) Date: Mar. 29, 2004

(87) PCT Pub. No.: WO03/029723

PCT Pub. Date: Apr. 10, 2003

(65) Prior Publication Data

US 2005/0175282 A1 Aug. 11, 2005

(30) Foreign Application Priority Data

Oct. 3, 2001 (GB) ................................ 0123813.8

(51) Int. Cl.
*G02B 6/10* (2006.01)
*H01J 5/16* (2006.01)

(52) U.S. Cl. ........................ 385/129; 385/130; 385/36; 385/901; 385/14; 313/113

(58) Field of Classification Search ................ 385/901, 385/115, 116, 117, 118, 119, 120, 14, 129, 385/130, 36, 37; 313/113, 116, 110
See application file for complete search history.

(56) References Cited

U.S. PATENT DOCUMENTS 5,669,700 A 9/1997 Wendel ...................... 362/322

(Continued)

FOREIGN PATENT DOCUMENTS

EP 0 377 309 7/1990 ............. 385/901 X (Continued)

*Primary Examiner*—Brian M. Healy
(74) *Attorney, Agent, or Firm*—David B. Patchett

(57) ABSTRACT

A light-guide light (1) suitable for use in illuminated displays and signs comprises a housing (3) defining an optical cavity having first and second generally parallel major faces (5, 6), and a light source (11) positioned to direct light into the optical cavity from one side. The first major face (5) comprises a material (for example, a prismatic film) having coefficients of reflection and transmission that vary with the angle at which light is incident on the material. The second major face (6) comprises a narrow-scattering reflective material having a reflectance of at least 85%, for example a highly-efficient reflective material provided with a suitable textured pattern.

12 Claims, 3 Drawing Sheets

U.S. PATENT DOCUMENTS

| | | | | |
|---|---|---|---|---|
| 6,061,489 | A * | 5/2000 | Ezra et al. | 385/115 |
| 6,096,247 | A | 8/2000 | Ulsh et al. | 264/2.7 |
| 6,096,375 | A * | 8/2000 | Ouderkirk et al. | 427/163.1 |
| 6,210,785 | B1 | 4/2001 | Weber et al. | 428/212 |
| 6,259,561 | B1 | 7/2001 | George et al. | 359/566 |
| 6,473,554 | B1 * | 10/2002 | Pelka et al. | 385/146 |
| 6,847,173 | B1 * | 1/2005 | Berthou et al. | 315/169.3 |
| 2004/0111132 | A1 * | 6/2004 | Shenderova et al. | 607/88 |
| 2004/0190573 | A1 * | 9/2004 | Kruschwitz et al. | 372/39 |

FOREIGN PATENT DOCUMENTS

| | | | |
|---|---|---|---|
| EP | 0 293 182 | 12/1993 | 385/901 X |
| GB | 2 310 525 | 8/1997 | 385/901 X |
| WO | WO 00/65277 | 11/2000 | 385/901 X |
| WO | WO 01/71248 A1 | 9/2001 | 385/901 X |
| WO | WO 03/029723 A2 | 4/2003 | 385/901 X |

* cited by examiner

LIGHT-GUIDE LIGHTS SUITABLE FOR USE IN ILLUMINATED DISPLAYS

FIELD OF THE INVENTION

The present invention relates to a light-guide light capable of providing an illuminated panel and suitable for use, for example, in illuminated displays and signs and in other lighting applications.

BACKGROUND OF THE INVENTION

It is already known to use light guides to illuminate panels for general lighting purposes and also for display applications (e.g. for illuminating signs and advertisements, and also for illuminating liquid crystal displays). In one form, often referred to as a light box, the light guide comprises a hollow box-shaped structure defining an optical cavity, and in another form it comprises a solid light-guiding plate. In both forms, a major surface of the guide can be illuminated by light directed into the guide in a direction generally parallel to that major surface, for example from at least one elongated light source or a similar arrangement located adjacent an edge of the light guide (so-called "edge-lit light guides").

Illuminated panels based on edge-lit light guides are generally thinner than those that are lit from behind and, as a result, are visually attractive and also particularly useful when the depth of the space available for a panel is restricted. They also offer the advantage that the light source is separated to some extent from the panel so that the heat input into the latter from the light source is reduced. Hollow light guides would appear to offer further advantages for applications that require the weight of the light guide to be kept as low as possible but, despite that, solid light guides have typically been more widely used because they are comparatively simple to produce and are the easiest way of transporting light.

Light guides in the form of hollow light boxes are described, for example, in EP-A-0 490 279; 0 377 309; and 0 293 182; and in GB-A-2 310 525. In each of those light boxes, a prismatic optical film is employed with a view to achieving a more even distribution of light over the surface that is being illuminated. Practical designs for light boxes, intended for use in illuminating graphic displays, are described in an Application Bulletin entitled "Thin Light Box" and issued in March 1990 by Minnesota Mining and Manufacturing Company of St. Paul, Minn., USA. U.S. Pat. No. 6,080,467 describes an illuminated sign comprising a light box, the interior surfaces of which comprise a multi-layer reflective optical film.

An illuminated sign, suitable for use on an automotive vehicle, is described in WO 00/65277. The sign comprises a housing having diffusely-reflecting interior surfaces and a front sign face through which light from inside the housing is transmitted, the light being supplied by a light fibre located on an interior surface of the housing.

International patent application WO01/71248 describes a hollow light guide suitable for use in illuminating a graphic display. The front face of the light guide comprises Scotch™ Optical Lighting Film and forms a window through which light can leave the light guide. The rear face of the light guide comprises a highly-efficient specularly-reflecting optical film printed with an array of dots in a diffusely-reflecting ink. These dots form light-extraction elements and cause light to be emitted through the front face of the light guide. The arrangement of the dots on the rear face of the light guide is related to the size and shape of the light guide to yield a uniform illumination of the front face.

There is a continuing demand for improved illuminated panels especially, but not exclusively, for display purposes. One problem with many display panels is that the panel is more brightly illuminated in the area closest to the light source, which detracts from the overall visual appearance and effectiveness of the illumination. Accordingly, there is a demand for improved uniformity in the illumination and for the elimination, from the illuminated panel, of any visible signs of the location and nature of the light source(s). It is also highly desirable, from an environmental and a cost point of view, that the amount of power used for illumination purposes should be kept as low as possible.

SUMMARY OF THE INVENTION

The present invention is directed to the problem of providing a light-guide light which is suitable for display purposes and capable of meeting the demands for uniform illumination and efficiency, and which can be assembled comparatively easily in a variety of sizes.

The present invention provides a light guide comprising a housing defining a light-guiding optical cavity having first and second generally parallel major faces, and at least one light source arranged to direct visible light into the cavity from one side, to be guided between the first and second major faces, wherein:

(a) the first major face comprises a material having coefficients of reflection and transmission that vary with the angle at which light is incident on the material; and b) the second major face comprises a narrow-scattering reflective material having a total reflectance of at least 85% for visible light incident on the surface at any angle;

whereby light from within the cavity is emitted substantially uniformly across the first major surface.

The term "narrow-scattering reflective material" means a material that reflects an incident collimated light beam into a broadened beam having a dispersion angle of less than about 15°. The term "dispersion angle" means the angle between the direction of maximum intensity ($I_{max}$) of reflected light and the direction of intensity with a value $I_{max}/2$, assuming an intensity of reflected light distribution curve that is symmetrical about the direction of $I_{max}$. If the intensity distribution curve of the reflected light is not symmetrical about the direction of $I_{max}$, the term dispersion angle as used herein means the mean angle between the direction of $I_{max}$ and a direction of intensity $I_{max}/2$. The broadened reflected beam may, or may not, exhibit a pronounced peak in the direction of maximum intensity.

Light-guide lights in accordance with the invention can be produced comparatively easily in different sizes in a manner that is appropriate to bespoke production, and can offer effective, uniform, and efficient illumination for display purposes and for other lighting applications.

BRIEF DESCRIPTION OF THE INVENTION

By way of example, embodiments of the invention will be described with reference to the accompanying drawings, in which.

DETAILED DESCRIPTION

Figure 1:
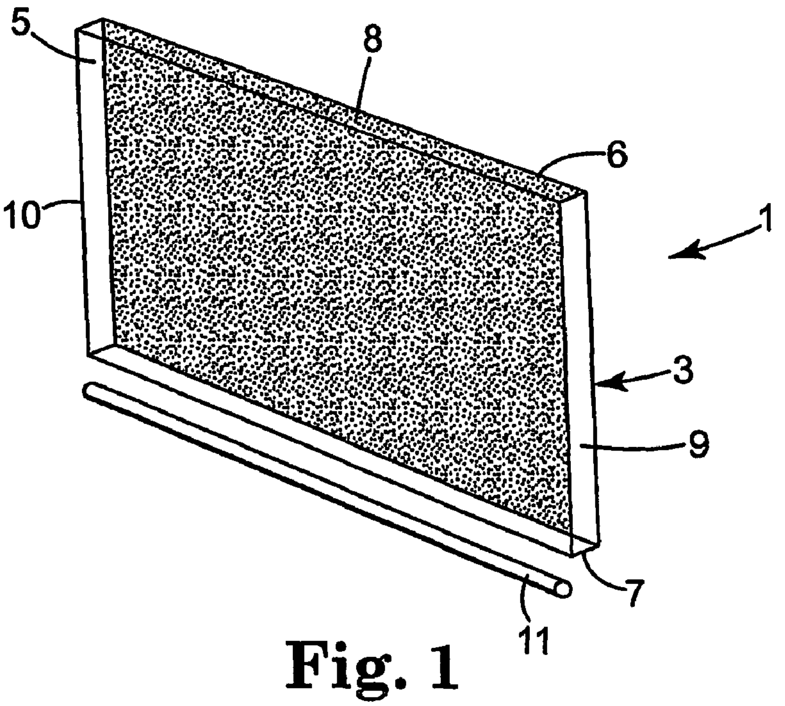
FIG. 1 is a perspective view of a light guide panel in accordance with the invention.

The light-guide light 1 shown in FIG. 1 comprises a box-like housing 3 defining an optical cavity. The housing 3 has opposed major faces 5, 6, and opposed narrow sides 7, 8 and 9, 10. An elongate light source 11 is arranged adjacent one of the narrow sides 7 to direct light into the optical cavity in a direction generally parallel to the planes of the major faces 5, 6. One of the major faces (the face 5) forms a window through which light can be emitted from within the optical cavity and used for illumination purposes.

Figure 3:
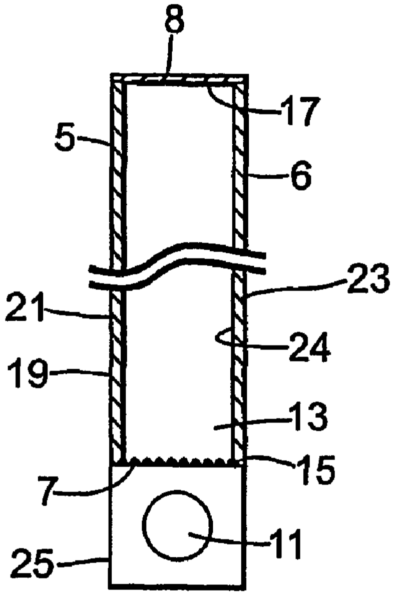
FIG. 3 is a diagrammatic cross-sectional view, on the line III—III of FIG. 2, of the light guide in assembled form.

The optical cavity 13 inside the housing 3 is visible in the diagrammatic illustration of FIG. 3. The narrow side 7 of the housing adjacent the light source 11 comprises an optical sheet material 15 forming a window through which light from the source 11 can enter the light guide 1. Preferably, the sheet material 15 has a structured surface on the side remote from the light source, to redirect the light from the source 11 and ensure that the light that passes through this window enters the optical cavity 13 preferentially in a direction generally parallel to the planes of the faces 5, 6. The optical sheet material 15 may, for example, have a structured surface comprising a series of ridges and grooves formed by a plurality of parallel triangular prisms. A similar use of sheet material of that type is described in EP-A-0 293 182. In the light guide 1, the material 15 is preferably oriented so that the prisms extend parallel to the elongate light source. Suitable sheet material is available, under the trade designation "Scotch™ Optical Lighting Film", from Minnesota Mining and Manufacturing Company of St. Paul, Minn., USA.

The narrow side 8 of the light guide 1 opposite the window 15 has a reflecting surface 17 on the side facing into the optical cavity 13. This reflecting surface, which is preferably a highly-efficient specularly-reflecting surface, can be provided by any suitable material but is preferably provided by a multi-layer optical film of the type described in U.S. Pat. No. 5,882,774 and WO97/01774. A suitable material is the film available, under the trade designation "VM2000 Radiant Mirror Film", from Minnesota Mining and Manufacturing Company of St. Paul, Minn., USA.

Figure 2:
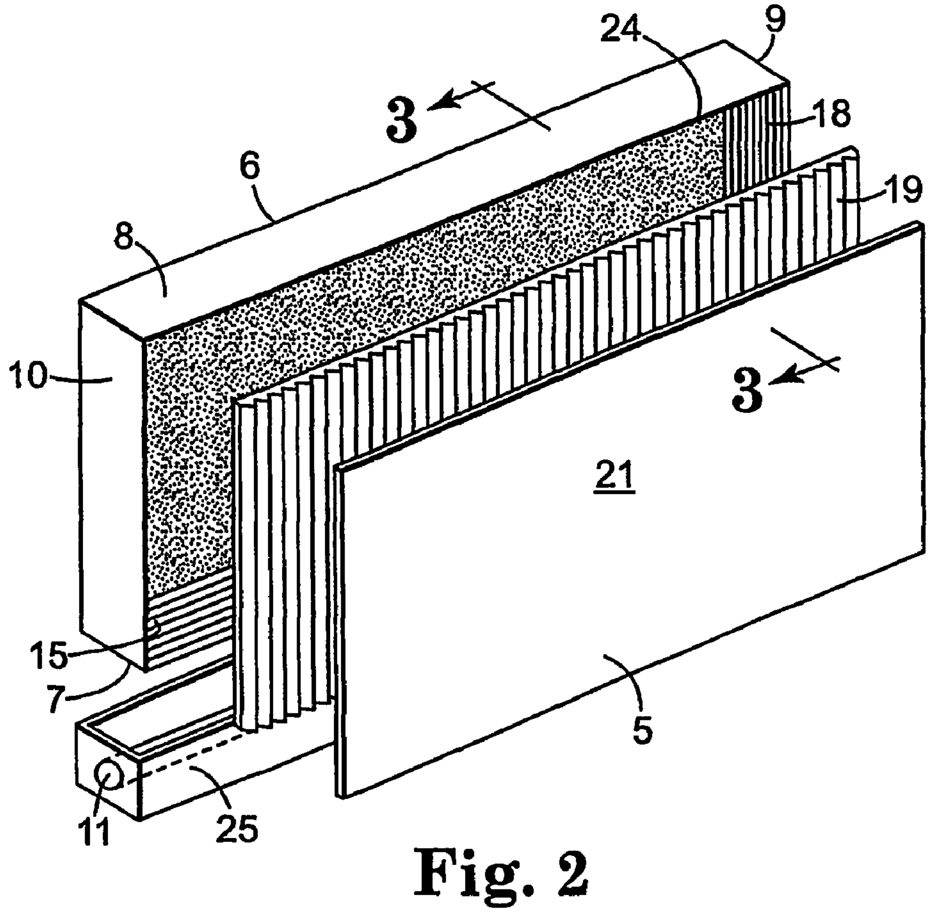
FIG. 2 is a diagrammatic perspective view of a light guide, similar to that shown in FIG. 1, the light guide being shown partly exploded.

The other two opposed narrow sides 9, 10 of the light guide also have reflecting surfaces 18 facing into the cavity (see FIG. 2). These reflecting surfaces 18 are preferably provided by a film material available, under the trade designation "Light Enhancement Film", from Minnesota Mining and Manufacturing Company of St. Paul, Minn., USA, although any other suitable reflecting material can be used. Generally, it has been found that a diffusely-reflecting material is preferable when the length/width ratio of these narrow sides is less than 10 and that a specularly-reflecting material is preferable when this ratio is greater than 10. It will be appreciated that this ratio corresponds to the length/thickness ratio of the light guide 1 (otherwise known as its "aspect ratio").

The front and rear faces 5, 6 of the light guide comprise materials that, preferentially, guide the light from the source 11 along the optical cavity 13, between the faces and towards the edge 8, although the front face 5 will also permit light to leave the optical cavity when it is incident on the face 5 at certain angles, as described below.

More specifically, the front face 5, or window, of the light guide comprises an optical sheet material 19 having coefficients of reflection and transmission that vary with the angle at which light is incident on the material. The material 19 has a smooth surface facing into the optical cavity and, on the side facing away from the optical cavity, a structured surface comprising a series of ridges and grooves formed by a plurality of parallel triangular prisms whereby light incident on the material 19 while traveling along the optical cavity 13 will be totally internally reflected provided it is incident on the material 19 within a predetermined angular range. As such, the material 19 may be the same as the material 15 and, in this case, the material is oriented so that the prisms extend in a direction at right angles to the direction of extent of the light source 11 as indicated in FIG. 2. A similar use of material of that type is described in EP-A-0 293 182. To protect the prismatic structures on the sheet material 19, a further panel 21 may be positioned adjacent the material 19 on the outside of the light guide housing. This further panel is not essential but, when provided, it may comprise a sheet of clear material or opalescent light-diffusing material. Use of an opalescent material may enhance even further the uniformity of the light that passes through the sheet material 19.

The rear face 6 of the light guide 1 comprises a sheet material 23 which provides a highly reflective-surface 24 facing into the optical cavity 13, the reflective surface 24 being capable of causing limited controlled spreading of an incident light beam into a broadened reflected beam. Materials of this type are known under the general descriptions "scattering reflective materials" and can be further classified as either "wide" or "narrow" scattering reflective materials, depending on the angular spread of the reflected beam (see "Daylighting in Architecture—A European Reference Book", published by James and James, London, 1993. ISBN 1-873936-214, at pages 4.3 to 4.5). In the light-guide 1, the reflective surface 24 is a narrow scattering reflector (meaning that it has a dispersion angle of less than about 15° or, more typically for the present application, between about 5° and 15°) but should be such that its reflectivity is not reduced substantially for light that is incident in directions other than normal to the surface, and is at least 85% (preferably at least 90% and, most desirably, at least 98%). To achieve that, the reflective surface 24 may be a highly-efficient reflective surface provided with a textured pattern that is designed to spread the reflected light in the desired manner without substantially degrading the total reflectivity of the surface. One example of a suitable scattering reflective material is the film material embossed with a sand-blast pattern that is available, under the trade designation "Radiant Light Film Embossed VM2000", from Minnesota Mining and Manufacturing Company of St. Paul, Minn., USA. An alternative sheet material is a highly reflective sheet metal material, for example sheet aluminium, formed with a suitable pattern to produce the desired spreading of the reflected light. In that case, a suitable pattern may be a pattern of dimples or bumps such as those produced by peening the sheet metal.

In FIGS. 2 and 3, the light source 11 is shown as being located in a three-sided housing 25, the open side of which is positioned adjacent the sheet material 15 forming the entry window of the light guide 1. The use of the sheet material 15 in the narrow side 7 of the light-guide housing adjacent the light source 11, although preferred in this arrangement, is not essential. The housing 25 is constructed to direct as much light as possible from the light source 11 into the optical cavity 13 and, to that end, the internal surfaces of the housing may be covered with a suitable highly-efficient, reflecting material, for example a reflective paint or sheet material. Alternatively, the light source 1 could be provided with a parabolic reflector to direct the light from the source towards the optical cavity 13, or it could be replaced by a suitable apertured light source, or a combination of both.

The light guide 1 as described above functions as follows. Light from the source 11 (possibly following reflection or redirection at the walls of the housing 25) enters the optical cavity 13 through the window material 15 and travels preferentially in a direction parallel to the major surfaces 5, 6 of the light guide towards the surface 17 where it will be reflected and returned. However, any light that is incident on the rear surface 24 will be spread on reflection and some of that light will, as a consequence, subsequently impinge on the front face 5 of the light guide in such a direction and at such an angle that it can pass through the optical sheet material 19 and emerge from the light guide. In other words, the rear surface 24 performs a light scattering function that enables light to be emitted through the front face 5 of the light guide while preserving the direction of light propagation within the optical cavity. It has been found that the overall effect of the construction of the light guide 1 is to provide high level, uniform, illumination of the front face 5. The uniformity is particularly good when the light guide 1 has an aspect ratio no greater than 10 but is also acceptable at higher aspects ratios. When used to illuminate a graphic display, the latter is placed on the outside of the sheet material 19 (i.e. adjacent the prisms) or on the outside of the panel 21 (when present). If the panel 21 is a sheet of clear material, the graphic display may be located between it and the sheet 19.

Figure 4:
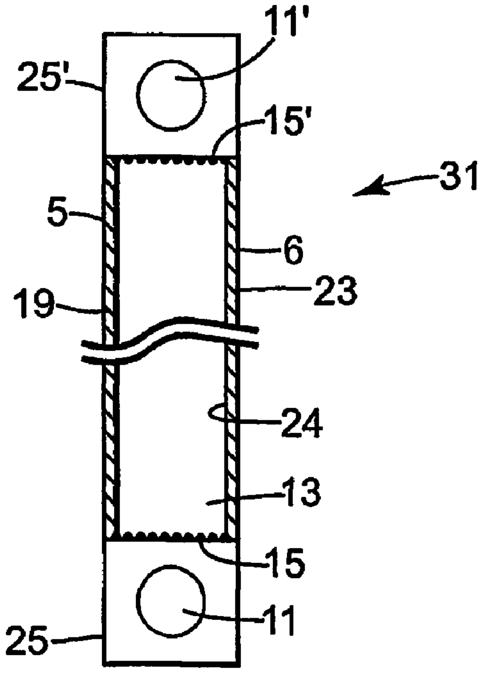
FIG. 4 is a cross-sectional view, similar to FIG. 3, of another light guide.

FIG. 4 illustrates a light guide 31 that is generally similar to the guide illustrated in FIGS. 2 and 3 but incorporates an additional light source 11' positioned opposite to the light source 11 (i.e. adjacent the narrow side 8 of the housing 3). To enable light from the source 11' to enter the optical cavity 13, the side 8 of the housing 3 comprises an optical sheet material 15' forming a window, rather than the reflecting material 17 of FIG. 3.

The light source 11' is located in a three-sided housing 25' similar to that of the light source 11 but, like the light source 11, it could alternatively be provided with a parabolic reflector to direct light from the-source into the-optical cavity, or be replaced by a suitable apertured-light source, or a combination of both. The material 15' forming the window from the housing 25' into the optical cavity 13 is preferably the same as the optical sheet material 15.

The light guide 31 functions in a similar manner to the guide 1 described above except that, in this case, light from both sources 11, 11' (possibly following reflection or redirection at the walls of the associated housing 25, 25') enters the optical cavity 13 through the associated window material 15, 15' and travels preferentially in a direction parallel to the major surfaces 5,6 of the light guide towards the light housing at the other end of the optical cavity where some of the light will be reflected and returned. Any light that is incident on the rear surface 24 will be spread on reflection and some of that light will, as a consequence, subsequently impinge on the front face 5 of the light guide in such a direction and at such an angle that it can pass through the optical sheet material 19 and emerge from the light guide. As with the light guide 1 of FIGS. 2 and 3, it has been found that the overall effect of the construction of the light guide 31 is to provide high level, uniform, illumination of the front face 5, particularly when the light guide 31 has an aspect ratio no greater than 10 (although the uniformity is also acceptable at higher aspect ratios). It will be noted that the rear surface 24 of the light guide 31 requires no modification, compared with the rear surface of the light guide 1, despite the fact that two light sources are used (which would not be the case, for example, if the rear surface were provided with a printed array of light extracting elements).

The use of a sheet material 23 for the rear face of the optical cavity 13 of the light guides 1, 31 is advantageous because such a material is easy to store and to handle prior to, and during, assembly of the light guide. When in use in the light guide, the sheet material 23 prevents light from leaving the optical cavity 13 through the rear face 6 and thus enhances the illumination of the front face 5. In addition, any scratches on the surface of the reflective sheet material (which might arise, for example, during handling or assembly of the light guide) will not adversely affect the uniform illumination of the front face 5. Only one form of sheet material 23 is required to produce light guides for illuminating panels in a comparatively wide range of differing sizes-within a particular range of aspect ratios (e.g. aspect ratios within the range of from 5 to 10). This, in turn, enables the assembly of the light guides to be simplified and the assembly time to be reduced since it is not necessary to design the face 24 of the sheet material specifically to suit the particular geometry of the light guide that is being produced.

A hollow light guide as described above with reference to FIGS. 1 to 3 or 4 can be fabricated in such a way that it is comparatively lightweight. That is a particular advantage when the light guide is large in size (for illuminating large signs, for example), and especially when it is required to be installed in a less accessible location. Of particular interest in the field of illuminated signs is the fact that edge-lit light guides can be fabricated with depths as small as 10 cm and even, depending on the size of the sign, as small as 1 cm.

The light sources employed with the light guides 1, 31 are not required to have an elongate form as illustrated. Other light sources could be employed including, for example, an array of light emitting diodes (LEDs).

The light guides illustrated in FIGS. 1 to 4 have been described above as being used to illuminate a graphic display but they could be used for other purposes including, for example, illuminating liquid crystal displays or signs or general illumination purposes.

Examples of illuminated signs incorporating light guides of the type illustrated in FIGS. 1 to 3 will now be described.

EXAMPLE I

The housing 3 of the light guide 1, excluding the front major face 5, may be a one-piece vacuum-formed construction of any suitable material, for example PVC (polyvinylchloride). Alternatively, the housing may be formed from several pieces of, for example, an acrylic material, each providing one side of the housing, which are secured together in any suitable manner. The housing is approximately 60×60×4.5 cm.

The internal surface of the rear major face 6 of the housing is covered with a sheet 23 of 3M™ "Radiant Light Film Embossed VM2000". The internal surface of one narrow side 7 of the housing 3 is covered with a sheet 15 of the above-mentioned "Scotch™ Optical Lighting Film", arranged with the prisms facing into the housing and extending parallel to the long edges of this side of the housing. The internal surface of the opposite narrow side 8 of the housing 3 is covered with a sheet of the above-mentioned "VM2000 Radiant Mirror Film." The internal surfaces of the remaining two narrow sides 9, 10 of the housing 3 are covered with the above-mentioned "Light Enhancement Film." Alternatively, all of the internal surfaces 6, 8, 9 and 10 may be formed from the above-mentioned "Radiant Light Film Embossed VM2000" material making it possible to vacuum-form these elements of the housing 3 from that film material.

The housing 3 is closed with a sheet 19 of the above-mentioned "Scotch™ Optical Lighting Film", forming the front major face 5. The film is arranged so that the prisms are on the outside of the housing and extend between the narrow sides 7 and 8.

The light guide module thus formed was put into a sign housing and provided with a 60 cm long, 14 W fluorescent lighting tube located, within a high-reflectance housing 25, adjacent the narrow side 7 of the light guide housing 3 and arranged to direct light into the latter. It was found that the front major face 5 of the housing 3 was illuminated with a high degree of uniformity and to a level sufficient to provide effective illumination of a graphic image located in front of the face 5.

EXAMPLE II

Figure 6:
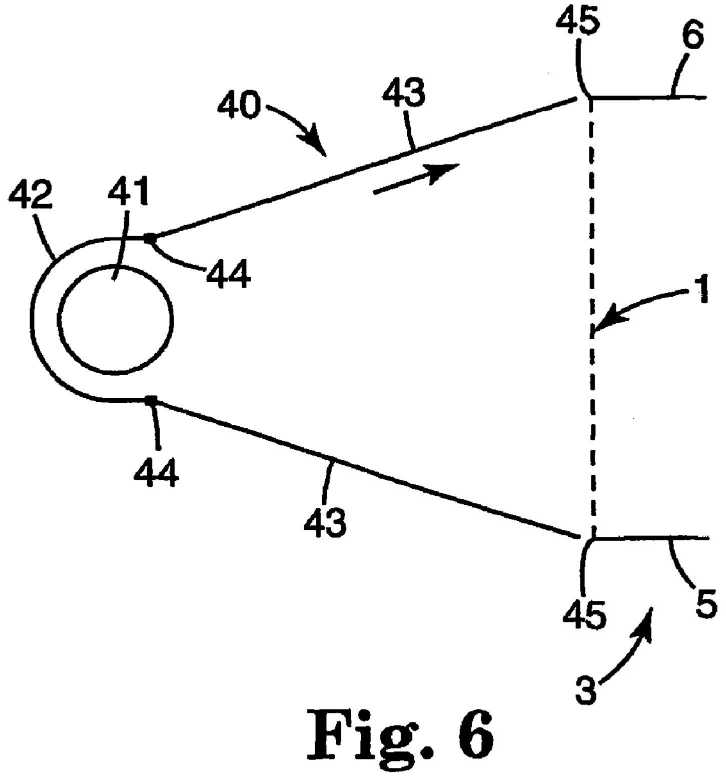
FIG. 6 is a diagrammatic transverse cross section of a lighting tube housing for use with a light-guide in accordance with the invention.

A light guide module similar to that described in Example I was constructed except that the housing 3 of the light guide was larger, having dimensions of approximately 120×180×6 cms. In addition, the optical sheet material 15 on the narrow side 7 of the housing 3 was omitted and the housing 25 for the lighting tube 11 was by a housing 40 illustrated diagrammatically in FIG. 6 which also illustrates the disposition of the housing relative to the narrow side 7 of the light guide housing 3. The lighting tube housing 40, which is separate from the light guide housing 3, extends along the length of the lighting tube (indicated in FIG. 6 by the reference 41) and thus along length of the side 7 of the light guide housing. The housing 40 includes a back portion 42 that is located to the rear of the lighting tube 41, and diverging flat sides 43 that extend from each front edge 44 of the back portion 42 towards the light guide housing 3. The diverging sides 43 define an exit opening through which light from the lighting tube 41 can leave the housing 40. The back portion 42 of the housing is shaped so that it partially surrounds, but is spaced from, the lighting tube 41 and permits the latter to extend slightly forwards of the front edges 44 as shown in the diagram. In FIG. 6, the back portion 42 is shown as curved but it could, instead, comprise a series of planar sections approximating to a curve. The inside surfaces of the housing 40 (i.e. both the back portion 42 and the sides 43) are covered with a highly-efficient specularly-reflective material, for example the above-mentioned "VM2000 Radiant Mirror Film."

The lighting tube 41 is a small-diameter fluorescent tube, for example a T5 tube having a diameter of about 16 mm, and there is a gap of about 3 mm between it and the back portion 42 of the housing 40. The sides 43 of the housing diverge at an angle of about 15° relative to a plane parallel to the major faces 5, 6 of the light guide housing 3 and extend forwardly of the lighting tube 41 until they meet the respective edges of the major faces 5, 6 of the light guide housing 3 (i.e. the exit opening of the lighting tube housing 40 corresponds to, and is immediately adjacent, the narrow side 7 of the light guide housing 3 to supply light directly into the latter).

In an illuminated sign constructed in accordance with this example, it was found that the front major face 5 of the housing 3 was illuminated with a high degree of uniformity and to a level sufficient to provide effective illumination of a graphic image located in front of the face 5.

Although the above examples, and the earlier description with reference to the drawings, relate to the construction of light guide modules, it will be appreciated that the same light guide construction could be built directly into the housing of a sign as a permanent part of the latter.

The use of a prismatic film material (such as the above-mentioned "Scotch™ Optical Lighting Film") to form the front face 5 of the light guide is also not essential although it is preferred. Any sheet material having coefficients of reflection and transmission that vary with the angle at which light is incident on the material can be used to form the front face 5 including, for example, a plane sheet of a transparent plastic material such as an acrylic material.

It will also be appreciated that other materials could be used for the rear surface of the optical cavity, provided that they are narrow-scattering reflective materials with a sufficiently high reflectance. For light guides having an aspect ratio of 10 or less, a narrow scattering reflective material that provides as broad a reflected beam as possible (i.e. a beam for which the dispersion angle is close to 15°) will be preferred. However, as the aspect ratio increases, scattering reflective materials that produce narrower reflected beams will provide an acceptable result. In some cases, it may be advantageous to use a material that spreads the reflected beam in a different manner (e.g. to produce a beam having pronounced asymmetry, being spread to a much greater extent in a plane parallel to the front and rear surfaces 5, 6 than in a plane parallel to the end faces 7, 8).

Figure 5:
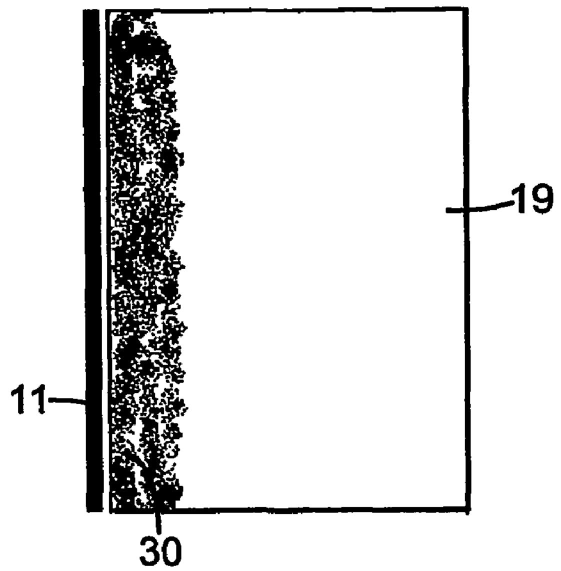
FIG. 5 illustrates a modification of the light guide of FIGS. 2 and 3.

It was indicated above that light guides constructed as described with reference to FIGS. 1 to 3 exhibit a somewhat less uniform (although still acceptable) light output when they have an aspect ratio of 10 or more. In particular, when viewing the front face 5 of the light guide 1, a region of increased light intensity may be apparent adjacent to the light source 11. This "edge glow" is generally more apparent if the prismatic film 19 is replaced by a plane sheet of transparent plastic material as described above, but can be reduced in a comparatively simple manner by applying light-absorbing elements to the inside face of the sheet material 19 (i.e. the face directed into the optical cavity 13) adjacent the light source. The light absorbing elements may, for example, be printed elements (e.g. dots) formed using a suitable ink (e.g. an opaque black ink with a gloss reflection). The surface coverage of the light absorbing elements is highest at the edge of the sheet 19 immediately adjacent the light source 11 (e.g. 70% coverage of the surface area) and decreases linearly to zero at a distance of about 150 mm from that edge. This is illustrated in FIG. 5, which shows a region 30 of light absorbing elements on the rear face of the sheet material 19 adjacent the light source 11. The light absorbing elements can be applied directly to the internal surface of the face 5 of the light guide 1 or they can be applied to a separate sheet of transparent material (e.g. vinyl) that is then laminated to the internal surface of the face 5: in each case, it has been found that the light absorbing elements are not discernible when an illuminated sign in which the light guide is incorporated is being viewed.

It has been found that the arrangement of light absorbing elements described above is effective for most sign dimensions and can, accordingly, be provided as a standard part of all light guides if required. If a light guide of the type shown in FIG. 4 is used, then a similar arrangement of light absorbing elements will also be required adjacent the second light source 11'.

What is claimed is:

1. A light-guide device comprising a housing defining a light-guiding optical cavity having first and second generally parallel major faces, and at least one light source arranged to direct visible light into the cavity from one side, to he guided between the first and second major faces, wherein;

(a) the first major face comprises a material having coefficients of reflection and transmission that vary with the angle at which light is incident on the material; and (b) the second major race comprises a narrow-scattering reflective material having a total reflectance of at least 85% for visible light incident on the surface at any angle;

whereby light frown within the cavity is emitted substantially uniformly across the first major surface.

2. At light-guide device as defined in claim 1, wherein the second major surface has a reflectance of at least 98% for visible light incident on the surface at any angle.

3. A light-guide device as defined in claim 1, wherein the second major surface comprises a specularly-reflecting material having a light-spreading structure formed thereon.

4. At light-guide device as defined in claim 1, wherein the second major surface comprises an optical film or sheet metal.

5. At light-guide device as defined in claim 1, wherein the second major surface comprises a sheet material laminated to an internal surface of the housing.

6. A light-guide device as defined in claim 1, further comprising a second light source arranged to direct light into the cavity from the end opposite the first-mentioned light source, to be guided between the major faces.

7. A light-guide device as defined in claim 1, wherein the first major face comprises one side of a sheet material that has a structured surface comprising a plurality of parallel prisms on the side remote from the optical cavity.

8. A light-guide device as defined in claim 1, wherein the first major face comprises one side of a planar sheet of transparent material.

9. A light-guide device as defined in claim 1, further comprising light-absorbing elements applied to the first major face in a region adjacent the/each light source.

10. A light-guide device as defined in claim 1, wherein a display that is to be illuminated is positioned outside the optical cavity in the path of light emitted through the first major face.

11. A light-guide device as defined in claim 1, wherein the light source is an elongate source that extends along the length of the side of the cavity through which it directs light into the cavity; the light source having an elongate housing comprising:

a back portion that is located to the rear of the lighting source, and is shaped so that it partially surrounds, but is spaced from, the lighting source, and diverging sides that extend from each front edge of the back portion towards the said side of the light guide cavity and define an exit aperture for light from the elongate housing;

wherein the internal surfaces of the back portion and the sides of the light source housing comprise a reflective material.

12. A light-guide device as defined in claim 11, wherein the diverging sides are so arranged that the exit aperture corresponds to, and is immediately adjacent, the said side of the optical cavity to direct light into the latter.

* * * * *

UNITED STATES PATENT AND TRADEMARK OFFICE

CERTIFICATE OF CORRECTION

PATENT NO. : 7,164,836 B2

APPLICATION NO. : 10/491097
DATED : January 16, 2007
INVENTOR(S) : John C. Wright It is certified that error appears in the above-identified patent and that said Letters Patent is hereby corrected as shown below:

Column 5,
Line 12, after “source” delete “1” and insert --11--, therefor.

Column 9,
Line 14, in claim 1, delete “he” and insert --be--, therefor.

Column 9,
Line 20, in claim 1, delete “race” and insert --face--, therefor.

Column 9,
Line 24, in claim 1, delete “frown” and insert --from--, therefor.

Column 9,
Line 26, in claim 2, delete “At” and insert --A--, therefor.

Column 9,
Line 32, in claim 4, delete “At” and insert --A--, therefor.

Column 9,
Line 35, in claim 5, delete “At” and insert --A--, therefor.

Signed and Sealed this

Tenth Day of April, 2007

JON W. DUDAS
*Director of the United States Patent and Trademark Office*